UNITED STATES PATENT OFFICE 2,409,124

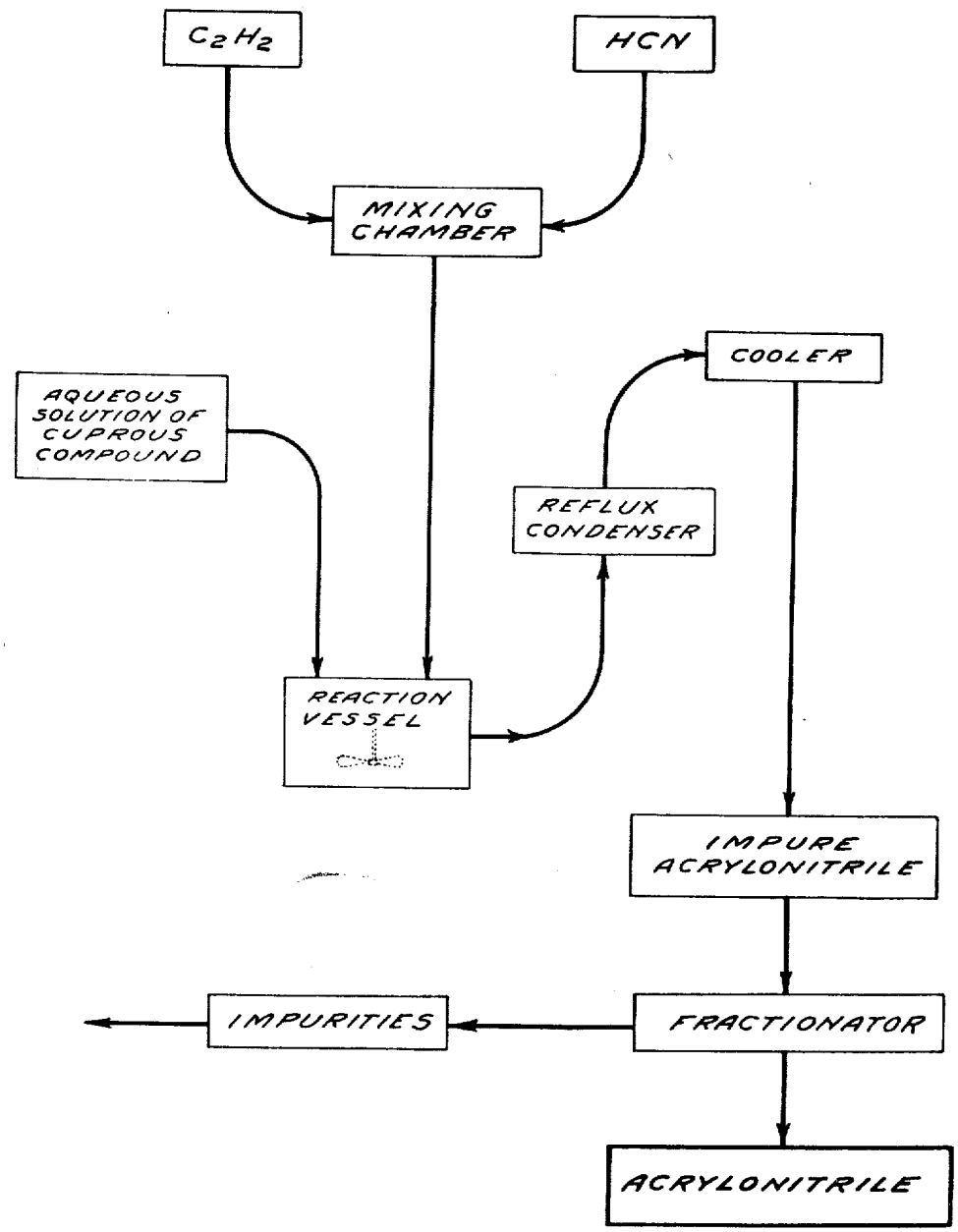

PREPARATION OF ACRYLONITRILE

Ralph V. Heuser, Glenbrook, Conn., assignor to American Cyanamid Company, New York, N. Y., a corporation of Maine Application October 19, 1940, Serial No. 361,986

19 Claims. (Cl. 260—464)

The present invention relates to a process for preparing acrylonitrile.

The principal object of the invention is to produce the above compound by reacting acetylene and HCN in the presence of a catalyst including a cuprous halide.

The production of acrylonitrile from acetylene and HCN may be represented as follows:

It has been proposed to carry out the above reaction using activated charcoal as a carrier for such alkaline catalysts as alkali metal or alkaline earth metal cyanides. Such a procedure is extremely difficult due to the fact that it must be conducted in gas phase, which means that large space volumes of reactants must be handled, involving expensive equipment. Even under the most favorable conditions, poor yields are obtainable and due to the high temperatures necessary for carrying out the reaction, there are considerable side reactions taking place together with decomposition. As a consequence, a very impure product is obtainable in very low yields.

It is one of the main objects of the present invention to produce acrylonitrile by the above reaction by a method involving simple and inexpensive apparatus, using a cheap catalyst which will produce yield efficiencies higher than that heretofore thought possible.

To this end, the invention contemplates in one of its aspects, the use of a cuprous halide, preferably cuprous chloride, as the catalyst. While the reaction may, according to the present invention, be carried out either in strictly gas phase or using a liquid reaction medium, yet the latter is preferred by reason of the simplicity of the apparatus required and the more favorable contact obtainable between the reactants. Another important consideration based on the latter procedure is that under those circumstances, the cuprous halide may be in solution, which facilitates its complete dissemination through the reaction medium and insures a more intimate contact with the reactants.

The invention further contemplates the novel steps of the method and conditions under which the reaction is carried out as more fully hereinafter described and shown in the flow sheet which diagrammatically illustrates a suitable arrangement of apparatus for carrying out the invention.

The cuprous halides are substantially insoluble in water, cuprous chloride being soluble only to the extent of approximately 1½%. The other halides, notably the fluoride, are even less soluble. However, it has been found that their water solubility may be increased if solution is effected in the presence of ammonium and alkali metal halides, such as ammonium, sodium or potassium chlorides. Acidification with inorganic acids such as hydrochloric is also effective in increasing the catalyst solubility. Under such conditions, the amount of cuprous halide dissolved is amply sufficient to effectively carry out the reaction using water as the reaction medium.

Inasmuch as it has been found that the copper halide is effective as a catalyst only in the cuprous state, it may be desirable under such circumstances, to add a certain amount of metallic copper to insure the absence of any material cupric salt.

Due to the fact that acetylene is only slightly soluble in water, it may be desirable under some circumstances, to use a reacting medium in which both reactants are more nearly soluble. For instance, both HCN and acetylene are known to have good solubilities in mono and polyhydric alcohols. By first dissolving the cuprous chloride in water or in water containing a small amount of ammonium chloride, this catalyst solution may then be completely disseminated throughout the alcoholic medium inasmuch as the alcohol and water are completely miscible in all proportions.

Starting then with a solution of the cuprous catalyst, HCN and acetylene may be added thereto by bubbling the mixture through the reaction carrier. Where the reaction takes place below the boiling point of HCN, this reactant may be added in liquid form. In any event, agitation is desirable in order to insure intimate and complete contact not only between the reactants but also with the catalyst.

While a relatively high temperature such as 75° C. is a desirable one for carrying out the reaction due to the fact that under these circumstances, the acrylonitrile may be distilled from the reaction mixture as fast as formed, yet this is not at all necessary. Lower temperatures may be used although it will be understood that temperatures as low as 20° C. or below have a tendency to slow up the reaction. As a matter of fact, the reaction being an exothermic one, it may be desirable to install means for removing this reaction heat from the reaction vessel.

Where a reaction carrier having a comparatively low boiling point is used, it will be found desirable to equip the reaction vessel with a reflux condenser in order to avoid abnormal losses.

Where commercial conditions dictate that it is more convenient to operate under gas phase conditions, the cuprous halide catalyst may be incorporated with such carriers as granular pumice, silica gel, porous calcined bauxite, charcoal or the like.

*Example I*

A solution of cuprous chloride may be made by dissolving the same in water containing a small amount of ammonium chloride acidified with hydrochloric acid. A solution containing from 2 to 5% of cuprous chloride is amply sufficient for the purpose.

A mixture of HCN gas and acetylene may then be bubbled through the reaction carrier containing the catalyst until an analysis of the outgoing gases indicates that there is no further reaction. Acrylonitrile may then be recovered from the reaction vessel by azeotropic distillation or solvent extraction methods.

*Example II*

53.5 liters of acetylene were bubbled through liquid HCN for 2.3 hours and the effluent gaseous mixture bubbled through an aqueous solution of cuprous chloride as above prepared. The reaction was carried out at from 83 to 85° C. with constant stirring during which time a distillate containing acrylonitrile was recovered and purified by fractional distillation.

*Example III*

52.5 liters of acetylene were bubbled through liquid HCN for 2.25 hours and the effluent gas mixture led into and below the surface of an aqueous solution of cuprous chloride prepared as above. The contents of the reaction vessel were heated to speed up the reaction, which proceeded more or less quietly over a range of between 81 and 83° C. during which time the mixture was constantly stirred. The product of this reaction, while containing considerable quantities of acrylonitrile, did not give as good a yield as the previous examples.

*Example IV*

A solution of cuprous bromide was prepared approximately like the catalyst of Example I by dissolving 394 g. of cuprous bromide in 260 g. of water containing 296 g. of ammonium bromide acidified with 3 cc. of hydrobromic acid. This gave a solution containing 45% by weight of cuprous bromide.

A mixture of HCN gas and acetylene was bubbled through the aqueous solution of the above cuprous bromide catalyst in a reaction vessel. Heating the reaction mixture to 85° C. with constant stirring gave a distillate from which acrylonitrile was recovered by fractional distillation.

Although in the above examples cuprous chloride is seemingly the most effective catalyst and hence is recommended, however the various other cuprous halides may likewise be used, particularly where ammonium or alkali metal halides are used to facilitate their solution in an acidified reaction medium.

While the invention has been shown and described with particular reference to specific embodiments, it is to be understood that it is not to be limited thereto but is to be construed broadly and restricted solely by the scope of the appended claims.

I claim:

1. The process of preparing acrylonitrile which comprises reacting acetylene and hydrocyanic acid in an aqueous solution of a cuprous halide as a catalyst at a temperature within the range of 60° to 110° C.

2. The process of preparing acrylonitrile which comprises reacting acetylene and hydrocyanic acid in an aqueous solution of cuprous chloride as a catalyst at a temperature within the range of 60° to 110° C.

3. The process of preparing acrylonitrile which comprises reacting acetylene and hydrocyanic acid in an aqueous solution of cuprous bromide as a catalyst at a temperature within the range of 60° to 110° C.

4. The process of preparing acrylonitrile which comprises reacting acetylene and hydrocyanic acid in an aqueous solution containing from 1.5 to 45% of a cuprous halide as a catalyst and a compound of the class consisting of ammonium and the alkali metal halides as a solubilizer, the reaction being effected at a temperature within the range of 60° to 110° C.

5. The process of preparing acrylonitrile which comprises reacting acetylene and hydrocyanic acid in an aqueous solution containing from 1.5 to 45% of cuprous chloride as a catalyst and a compound of the class consisting of ammonium and the alkali metal chlorides as a solubilizer, the reaction being effected at a temperature within the range of 60° to 110° C.

6. The process of preparing acrylonitrile which comprises reacting acetylene and hydrocyanic acid in an aqueous solution containing from 1.5 to 45% of cuprous bromide as a catalyst and a compound of the class consisting of ammonium and the alkali metal bromides as a solubilizer, the reaction being effected at a temperature within the range of 60° to 110° C.

7. The process of preparing acrylonitrile which comprises reacting acetylene and hydrocyanic acid in the presence of a catalytic solution of a cuprous halide.

8. The process of preparing acrylonitrile which comprises reacting acetylene and hydrocyanic acid in the presence of an aqueous catalytic solution of a cuprous halide.

9. The process of preparing acrylonitrile which comprises reacting acetylene and hydrocyanic acid in the presence of an acidic catalytic solution of a cuprous halide.

10. The process of preparing acrylonitrile which comprises reacting acetylene and hydrocyanic acid in the presence of an acidic catalytic solution of cuprous chloride.

11. The process of preparing acrylonitrile which comprises reacting acetylene and hydrocyanic acid in the presence of an acidic catalytic solution of cuprous bromide.

12. The process of preparing acrylonitrile which comprises reacting acetylene and hydrocyanic acid in the presence of an acidic aqueous solution comprising 1.5 to 45% of a cuprous halide as a catalyst and an ammonium salt as a solubilizer for the cuprous salt.

13. The process of preparing acrylonitrile which comprises reacting acetylene and hydrocyanic acid in the presence of an acidic aqueous solution comprising 1.5 to 45% of a cuprous halide as a catalyst and an ammonium halide as a solubilizer for the cuprous salt.

14. The process of preparing acrylonitrile which comprises reacting acetylene and hydrocyanic acid in the presence of an acidic aqueous solution comprising 1.5 to 45% of cuprous chloride as a catalyst and ammonium chloride as a solubilizer for the cuprous chloride.

15. The process of preparing acrylonitrile which comprises reacting acetylene and hydrocyanic acid in the presence of an acidic aqueous solution comprising 1.5 to 45% of cuprous chloride as a catalyst and ammonium chloride as a solubilizer for the cuprous chloride, said solution containing copper powder suspended therein.

16. The process of preparing acrylonitrile which comprises reacting acetylene and hydrocyanic acid in the presence of an aqueous solution containing 1.5 to 45% by weight of cuprous chloride as a catalyst and ammonium chloride as a solubilizer for the cuprous chloride, said solution containing copper powder suspended therein to maintain the copper in the cuprous state.

17. The process of preparing acrylonitrile which comprises reacting acetylene and hydrocyanic acid in the presence of an aqueous catalytic solution at a temperature of 60° to 110° C. and comprising 1.5 to 45% by weight of a cuprous halide as a catalyst and an ammonium salt as a solubilizer for the cuprous salt, said solution containing copper powder suspended therein to maintain the copper in the cuprous state.

18. Process for the manufacture of acrylonitrile which comprises bringing acetylene together with hydrocyanic acid into contact with an aqueous acid reacting solution of cuprous chloride, said solution containing also a salt of the class consisting of ammonium and alkali metal salts.

19. The process of preparing acrylonitrile which comprises reacting acetylene and hydrocyanic acid in an acidic aqueous solution comprising cuprous chloride and ammonium chloride as a solubilizer for the cuprous chloride.

RALPH V. HEUSER.

Disclaimer 2,409,124.—*Ralph V. Heuser*, Glenbrook, Conn. PREPARATION OF ACRYLONITRILE. Patent dated Oct. 8, 1946. Disclaimer filed Mar. 30, 1949, by the assignee, *American Cyanamid Company*.

Hereby enters this disclaimer to claims 1, 2, 4, 5, 7, 8, 9, 10, 12, 13, 14, 15, 16, 17, 18, and 19 of said patent.

[*Official Gazette April 26, 1949.*]

ous solution comprising 1.5 to 45% of cuprous chloride as a catalyst and ammonium chloride as a solubilizer for the cuprous chloride.

15. The process of preparing acrylonitrile which comprises reacting acetylene and hydrocyanic acid in the presence of an acidic aqueous solution comprising 1.5 to 45% of cuprous chloride as a catalyst and ammonium chloride as a solubilizer for the cuprous chloride, said solution containing copper powder suspended therein.

16. The process of preparing acrylonitrile which comprises reacting acetylene and hydrocyanic acid in the presence of an aqueous solution containing 1.5 to 45% by weight of cuprous chloride as a catalyst and ammonium chloride as a solubilizer for the cuprous chloride, said solution containing copper powder suspended therein to maintain the copper in the cuprous state.

17. The process of preparing acrylonitrile which comprises reacting acetylene and hydrocyanic acid in the presence of an aqueous catalytic solution at a temperature of 60° to 110° C. and comprising 1.5 to 45% by weight of a cuprous halide as a catalyst and an ammonium salt as a solubilizer for the cuprous salt, said solution containing copper powder suspended therein to maintain the copper in the cuprous state.

18. Process for the manufacture of acrylonitrile which comprises bringing acetylene together with hydrocyanic acid into contact with an aqueous acid reacting solution of cuprous chloride, said solution containing also a salt of the class consisting of ammonium and alkali metal salts.

19. The process of preparing acrylonitrile which comprises reacting acetylene and hydrocyanic acid in an acidic aqueous solution comprising cuprous chloride and ammonium chloride as a solubilizer for the cuprous chloride.

RALPH V. HEUSER.

Disclaimer 2,409,124.—*Ralph V. Heuser*, Glenbrook, Conn. PREPARATION OF ACRYLONITRILE. Patent dated Oct. 8, 1946. Disclaimer filed Mar. 30, 1949, by the assignee, *American Cyanamid Company*.

Hereby enters this disclaimer to claims 1, 2, 4, 5, 7, 8, 9, 10, 12, 13, 14, 15, 16, 17, 18, and 19 of said patent.

[*Official Gazette April 26, 1949.*]